US006963386B2

(12) United States Patent
Poliakine et al.

(10) Patent No.: US 6,963,386 B2
(45) Date of Patent: *Nov. 8, 2005

(54) MODULAR FRONT-LIT DISPLAY PANEL

(75) Inventors: Ran Poliakine, Mevasseret Zion (IL); Amir Ben-Shalom, Mevasseret Zion (IL)

(73) Assignee: Magink Display Technologies, Ltd., Mevasseret Zion (IL)

(*) Notice: Subject to any disclaimer, the term of this patent is extended or adjusted under 35 U.S.C. 154(b) by 0 days.

This patent is subject to a terminal disclaimer.

(21) Appl. No.: 10/666,230

(22) Filed: Sep. 18, 2003

(65) Prior Publication Data

US 2004/0061811 A1 Apr. 1, 2004

Related U.S. Application Data

(63) Continuation-in-part of application No. 09/381,818, filed as application No. PCT/IL98/00135 on Mar. 25, 1998, now Pat. No. 6,690,443.

(30) Foreign Application Priority Data

Mar. 25, 1997  (IL) ................................. 120529
Mar. 25, 1997  (IL) ................................. 120530

(51) Int. Cl.$^7$ ...................... G02F 1/1345; G02F 1/1333
(52) U.S. Cl. ......................................... 349/152; 349/58
(58) Field of Search ................... 349/58, 149, 152, 349/106, 78–80

(56) References Cited

U.S. PATENT DOCUMENTS

| 4,299,447 A | * | 11/1981 | Soltan et al. ................ 349/159 |
| 5,384,067 A | | 1/1995 | Doane et al. ................ 349/169 |
| 5,541,749 A | | 7/1996 | Konuma et al. ............ 349/106 |
| 6,690,443 B1 | * | 2/2004 | Poliakine .................... 349/152 |

* cited by examiner

*Primary Examiner*—Dung Nguyen
(74) *Attorney, Agent, or Firm*—Galbreath Law Office, P.C.; John A. Galbreath

(57) ABSTRACT

A front-lit display panel comprising: at least one pixel units, each having a layered structure including transparent conductor, an active layer containing liquid-crystal-type molecules, and a rear conductive layer, electrical connectors in electrical contact with the rear conductive layer and extending to the rear portion of the pixel unit; and a plurality of electronics module for respectively receiving each pixel unit, each having a conformal interconnection facilities with the at least two contacts adapted for making electrical contact with the electrical connectors, and interfacing with at least one data communications line and at least one electric power line; and an assembly board for receiving the at least one second conformal interconnection facilities, each receiving position having at least two contacts respectively adapted for making electrical contact with the data communications line and with electric power line of one of the electronics modules.

29 Claims, 3 Drawing Sheets

MODULAR FRONT-LIT DISPLAY PANEL

This application is a Continuation In Part application that claims priority through U.S. application Ser. No. 09/381,818 filed Dec. 22, 1999, now U.S. Pat. No. 6,690,443, which is a 371 of PCT/IL98/00135, filed Mar. 25, 1998 that is incorporated by reference herein, A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to display panels and, in particular, it concerns dynamically controlled front-lit display panels based on liquid crystal technology.

BACKGROUND OF THE INVENTION

Liquid crystal display (LCD) devices have become considerable more compact than their respective laboratory demonstration models. This has occurred in part because of improved manufacturing methods and in part because of more compact packing for the electronic circuits, which drive the LCD and/or which receive data communications of content to be displayed on the LCD.

In this context, there is an ongoing need to improve the electromechanical interfaces between the LCD and its electronics, between front end portions of the electronics and back end portions of the electronics, between the electronics and data communications, between the electronics and electric power, and the likes. Furthermore, as the overall costs of LCD devices continues to decline, there is an ongoing need to configure new mechanical mounting systems for the LCD—in order to allow facile access, modular maintenance, easy application assembly, and the likes.

In addition, there remains an ongoing need to for further improvements in the field of front-lit display panels which are simple in structure, easy to produce, provides high contrast and dark color capabilities, and are suitable for large scale applications.

BRIEF SUMMARY OF THE INVENTION

The aforesaid longstanding needs are significantly addressed by embodiments of the present invention, which specifically relates to embodiments of display panels.

Accordingly, the present invention relates to embodiments of a front-lit display panel comprising: a plurality of pixels units, each pixel unit having: a layered structure including a sequence of a transparent conductor, an active layer containing liquid-crystal-type molecules, and a rear conductive layer, parts of the pixel unit which lie on a side of the rear conductive layer remote from the active layer being designated as the "rear portion" (furthest from an observer of the display graphics) of the pixel unit, a first electrical connector in electrical contact with the rear conductive layer and extending to the rear portion of the pixel unit, and a second electrical connector in electrical contact with the transparent conductor and extending to the rear portion of the pixel unit; and a plurality of electronics module for respectively receiving each pixels units, each the module having a first conformal interconnection facility with the at least two contacts adapted for making electrical contact with the first and second electrical connectors of one of the pixel unit, and a second conformal interconnection facility for interfacing with at least one data communications line and at least one electric power line; and an assembly board for receiving the plurality of second conformal interconnection facilities, each receiving position having at least two contacts respectively adapted for making electrical contact with the data communications line and with electric power line of one of the electronics modules.

Essentially, these embodiments explicitly detail an interface topology of inline electronics—which are commonly used in LCDs to drive the optical states of the display(s). This explication of the heretofore described and illustrated enabling modes of the parent invention allows a user to achieve further refinements in the improvements portrayed in the earlier modular front lit display panel disclosure.

In the context of the instant invention, it should be appreciated that for purposes of accomplishing data communications, electrical contacts adapted for making respective contact with respective electrical connectors may be comprised of a mechanical touching of the conductors or may equivalently be comprised of proximity antennas for facilitating simplex, half duplex or full duplex low-power radio communications. It should be understood by the ordinary man of the art that shielding is preferably provided using a physical conduit surrounding the paired antennas—so as to prevent spurious cross talk between adjacent modules—in the likely event that there is a plurality of proximate units operating by radio communications; or in the event that there may be simultaneous transmissions between radio broadcast proximate units—while electric power may be separately accomplished for each respective side of the communications (even by using a portion of the voltage in the data communications signal per se—or induced thereby—on provision that the result is adequate to accomplishing the LC driving method elected therein). Alternatively, respectively matched antennas may use a protocol variable that avoids interference—such as a unique data prefix, a predetermined time slot, a mutually agreed sparsely used frequency assignment, or the likes.

The present invention also relates to embodiments of a display module computer program product including a computer usable medium having computer readable program code embodied therein for transferring data communications related to a current display state from an electronics module of a front lit display panel to an adjacent electronics module on the front lit display panel, the computer readable program code in the program including: first computer readable program code for causing a computer to schedule transfer of a current state of pixel unit associated with an electronic unit; tied to the first computer readable software, second computer readable program code for causing the computer to transfer the current state of pixel unit from the respective associated electronic unit to a first adjacent electronics unit; and tied to the first computer readable software, second computer readable program code for causing the computer to accept a current state of a pixel unit from a second respective associated adjacent electronic unit. Simply stated, these embodiments facilitate Marquee and artificial life type display graphics for a plurality of LCDs properly aligned.

The present invention furthermore relates to embodiments of a front-lit color display panel comprising at least one pixel unit, each pixel unit having a layered structure including a sequence of: a transparent conductor, an active layer containing stabilized chiral nematic liquid crystal, and a rear conductive layer, and wherein the at least one pixel unit includes a pixel element in which the stabilized chiral nematic liquid crystal assumes a reflective state in which a predetermined color is reflected. Simply stated, these embodiments relate to an essential enabling article of contributory infringement—a display panel—which is of independent commercial use many low bandwidth applications.

Notices

Numbers, alphabetic characters, and roman symbols are designated in the following sections for convenience of explanations only, and should by no means be regarded as imposing particular order on any method steps. Likewise, the present invention will forthwith be described with a certain degree of particularity, however those versed in the art will readily appreciate that various modifications and alterations may be carried out without departing from either the spirit or scope, as hereinafter claimed. Furthermore, additional details of layered structures and other enabling particulars (such as typical LC drive schemes and the likes) are presented in various views and cross-sections and may be appreciated from the figures of the parent application.

In describing the present invention, explanations are presented in light of currently accepted scientific theories and technological models. Such theories and models are subject to changes, both adiabatic and radical. Often these changes occur because representations for fundamental component elements are innovated, because new transformations between these elements are conceived, or because new interpretations arise for these elements or for their transformations. Therefore, it is important to note that the present invention relates to specific technological actualization in embodiments. Accordingly, theory or model dependent explanations herein, related to these embodiments, are presented for the purpose of teaching, the current man of the art or the current team of the art, how these embodiments may be substantially realized in practice. Alternative or equivalent explanations for these embodiments may neither deny nor alter their realization.

BRIEF DESCRIPTION OF THE DRAWINGS

In order to understand the invention and to see how it may be carried out in practice, embodiments including the preferred embodiment will now be described, by way of non-limiting example only, with reference to the accompanying drawings. Furthermore, a more complete understanding of the present invention and the advantages thereof may be acquired by referring to the following description in consideration of the accompanying drawings, in which like reference numbers indicate like features and wherein.

DETAILED DESCRIPTION OF THE INVENTION

Figure 1:
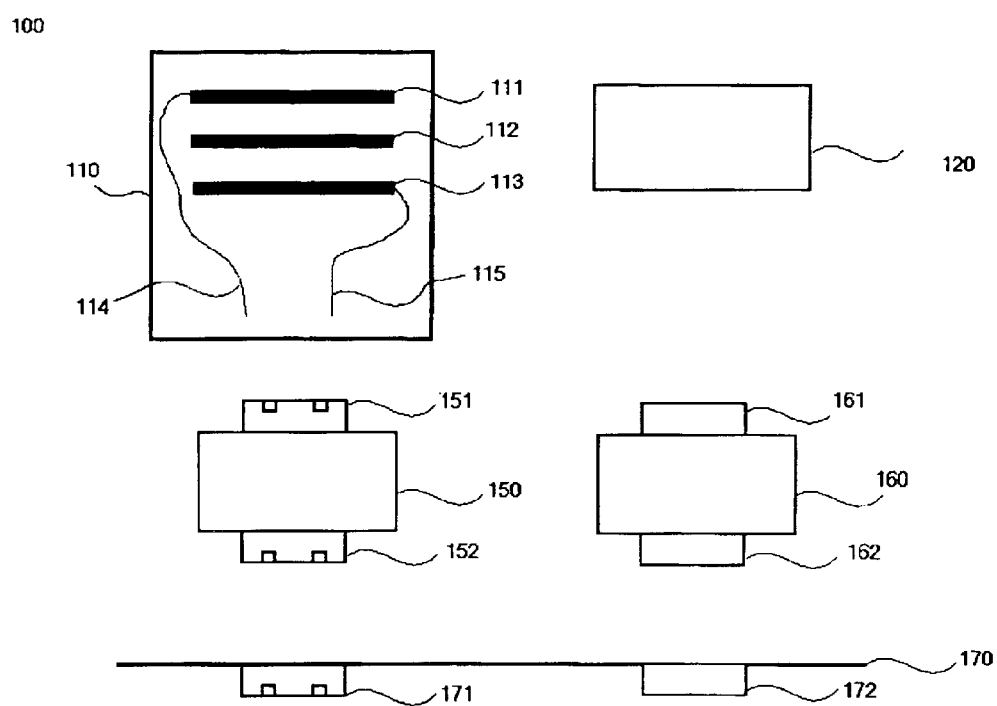
FIG. 1 illustrates a schematic view of the fundamental embodiment of the instant invention.

Accordingly, (turning to FIG. 1) the present invention relates to embodiments of a front-lit display panel 100 comprising: a plurality of pixels units 110,120, each pixel unit having: a layered structure including a sequence of a transparent conductor 111, an active layer containing liquid-crystal-type molecules 112, and a rear conductive layer 113, parts of the pixel unit which lie on a side of the rear conductive layer remote from the active layer being designated as the "rear portion" of the pixel unit, a first electrical connector 114 in electrical contact with the rear conductive layer and extending to the rear portion of the pixel unit, and a second electrical connector 115 in electrical contact with the transparent conductor and extending to the rear portion of the pixel unit; and a plurality of electronics module 150, 160 for respectively receiving each pixels units, each the module having a first conformal interconnection facility 151, 161 with the at least two contacts adapted for making electrical contact with the first and second electrical connectors of one of the pixel unit, and a second conformal interconnection facility 152, 162 for interfacing with at least one data communications line and at least one electric power line; and an assembly board 170 for receiving the plurality of second conformal interconnection facilities 171, 172, each receiving position having at least two contacts respectively adapted for making electrical contact with the data communications line and with electric power line of one of the electronics modules.

According to one embodiment of the display panel, the active layer contains a material selected from the list: a colored dye and a colored pigment. These and substantially equivalent additives are introduced into the active layer at manufacture time in order to delicately shift the chromatic response characteristics of the layer when activated, or of the appearance of the location when this layer is substantially transparent (except for the scattering deviations caused by the additives—of course). In this context, the dyes may be simple colored inert fluids or they may be optically active ingredients that may have a fluorescent spectral response, or otherwise accept light of one frequency and instantly transmit light of a different frequency. Likewise, in this context, pigments may be simple colored micro particles or they may be optically active—either in the same sense as described for the dyes or as micro scattering reflective particulate—such as is provided by inert metallic micro "grit"—which causes a glittering effect in the layer, or the likes.

According to another embodiment of the display panel, the pixel unit is further comprising a colored filter positioned in front of the transparent conductor. Instantiations of the color filter may be of narrow or of broad frequency. They may be dichroic, fluorescent, or combinations thereof. They may be of predetermined chiral material or of mixed chiral materials—and the selected chiral characteristics are preferably matched to improve the overall optical character of the underlying LC layer(s).

According to a further embodiment of the display panel, the active layer includes PDLC material, chiral nematic liquid crystal material, or the likes—substantially as disclosed in the original parent application cited above.

According to a different embodiment of the display panel, the assembly board has a plurality of sockets, one of the sockets being located at each of the module receiving positions, and wherein the rear portion of each module includes a conformal interface shaped for engaging one of the sockets. Mutatis mutandis, the interface may be using respectively communicating antennas brought into near-touching proximity, while electric power may be separately accomplished for each respective side of the communications.

According to another different embodiment of the display panel, the first and second connectors include connecting strips associated with a conformal interface port of the respective module. These strips may be flexible connectors, coaxial cables, or the likes.

According to a further different embodiment of the display panel, the rear conductive layer is transparent, and wherein the rear portion of the pixel unit includes a material selected from the list: a black backing, an opaque backing, a partially reflective backing, a fluorescent backing, a dichroic backing, a reflective backing, an active optically illuminating backing, and an active ultraviolet illuminating backing. Mutatis mutandis, the backing may likewise include dyes, pigments, filters, fluorescent ingredients, reflective particulate, or the likes.

According to still a further different embodiment of the display panel, the plurality of pixel units, includes a first group of pixel units in which the active layer assumes a relatively high reflectivity state in which a first color is reflected, a second group of pixel units in which the active layer assumes a relatively high reflectivity state in which second color is reflected, and a third group of pixel units in which the active layer assumes a relatively high reflectivity state in which a third color is reflected. Simple examples include each of the three possible ordered combinations of a red layer, a green layer, and a blue layer—or a magenta layer a cyan layer and a yellow layer—or the likes.

According to yet another embodiment of the display panel, one of the transparent conductor and the rear conductive layer is subdivided into a plurality of discontinuous regions, each of the regions being provided with a separate electrical connector in electrical contact with the region and extending to the rear portion of the pixel unit. Simply stated, this relates to display elements that are for predetermined font alphanumeric shapes, icons, and the likes.

According to one useful variation embodiment of the display panel, the regions are arranged in a two dimensional array, one of the dimensions corresponding to two of the regions. Simply stated, this relates to tessellated pixel grids—either stack aligned or dithered.

According to still another different embodiment of the display panel, the layered structure of each of the pixels further includes: an intermediate transparent conductor and a second active layer containing liquid-crystal-type molecules, the intermediate transparent conductor and the second active layer being located between the first-mentioned active layer and the rear conductive layer, and a third electrical connector in electrical contact with the intermediate transparent conductor and extending to the rear portion of the pixel unit—substantially according to the teaching of the parent application.

According to alas another facile embodiment of the display panel, the pixel unit is detachable from the electronics module and the electronics unit is substantially integral to the assembly board. Mutatis mutandis, this relates to mechanical touching contacts, proximate antennas, or the likes. According to a further facile embodiment of the display panel, the pixel unit is substantially integral to the electronics module and the electronics unit is detachable from the assembly board. According to yet another interesting embodiment of the display panel, the pixel unit is detachable from the electronics module and the electronics unit is detachable from the assembly board.

According to one useful variation embodiment of the display panel, the pixel unit of a single multilayered pixel has predetermined dynamic optical properties in each layer. Mutatis mutandis, this relates to elective of scattering, transparent and intermediate states, to respective color spectrum response characteristics in the presence of frontal sunlight, predetermined artificial light, typical out door lighting, typical indoor lighting, and the likes. However, in the context of the instant invention it is preferred that the illumination be of a substantially predetermined optical character—with minimal uncontrollable variability.

According to one useful variation embodiment of the display module, the electronics module receives a plurality of pixel units. Hence there is no rigid one-to-one relationship between the electronics and the pixel units—albeit each unit must be connected or data communications accessible according to the temporal requirements of its optical or content refresh schedule.

According to another useful embodiment of the display module, the pixel unit is connected to the electronics module using a flexible cable. Mutatis mutandis, these may be a flat series of parallel conductive paths, a coaxial cable (for modulated data-communications signals), or the likes.

According to yet another facile and useful embodiment of the display module, the electronics unit is connected to the assembly board using a flexible cable. Mutatis mutandis, these likewise may be a flat series of parallel conductive paths, a coaxial cable (for modulated data-communications signals), or the likes.

According to still a different interesting embodiment of the display module, the electronics module includes at least one data communications interface to at least one neighboring electronics module on the assembly board. Simply stated, this embodiment relates to Marquee style displays (such as stock-market or news-wire ticker tape information displays)—but may also relate to artistic "artificial life" (a term of the are that originated in fields such as Artificial Intelligence, Cellular Automaton, and the likes) type displays that propagate visual motif fragments across a composite tessellated display according to some predetermined or heuristic rule set.

According to yet a further interesting and facile embodiment of the display module, the electronics module includes at least one electrical interface to at least one neighboring electronics module on the assembly board. This embodiment facilitates a lowering of the complexity in a preponderance of modules—since only a first module in a series of modules need "understand" how to actualize the data communications content—while further modules in the series need only accept a "repeating" of the heretofore "understood" data communications. Mutatis mutandis, this embodiment relates to Marquee style displays (such as stock-market or news-wire ticker tape information displays)—but may also relate to artistic "artificial life" type displays that propagate visual motif fragments across a composite tessellated display according to some predetermined or heuristic rule set.

According to a quintessential embodiment of the display module, the electronics module includes a programmable microprocessor. Mutatis mutandis, this facilitates data communications using fewer mechanical touch-like contacts (using modulated signals, packets, or the likes), Marquee style displays, and the likes.

Figure 2:
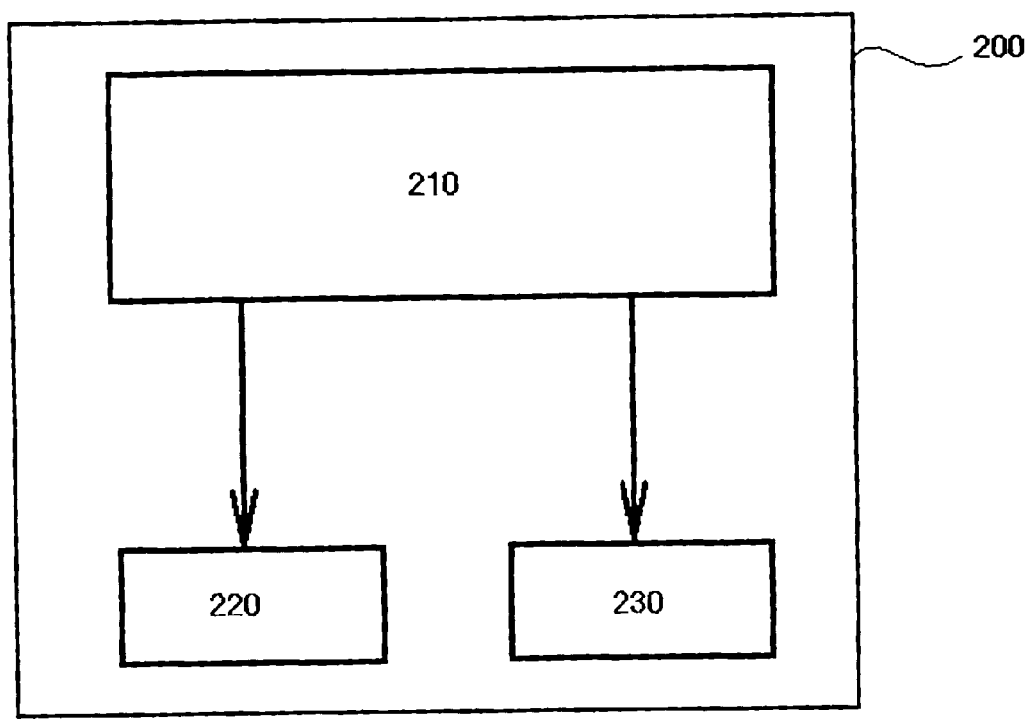
FIG. 2 illustrates a schematic view of software associated with a special application of the instant invention.

The present invention (turning to FIG. 2) also relates to embodiments of a display module computer program product including a computer usable medium having computer readable program code 200 embodied therein for transferring data communications related to a current display state from an electronics module of a front lit display panel to an adjacent electronics module on the front lit display panel, the computer readable program code in the program including: first computer readable program code 210 for causing a computer to schedule transfer of a current state of pixel unit associated with an electronic unit; tied to the first computer readable software, second computer readable program code 220 for causing the computer to transfer the current state of pixel unit from the respective associated electronic unit to a first adjacent electronics unit; and tied to the first computer readable software, second computer readable program code 230 for causing the computer to accept a current state of a pixel unit from a second respective associated adjacent electronic unit. Mutatis mutandis, this embodiment relates to Marquee style displays (such as stock-market or news-wire ticker tape information displays)—but may also relate to artistic "artificial life" type displays that propagate visual motif fragments across a composite tessellated display according to some predetermined or heuristic rule set.

According to one useful variation embodiment of the display module computer program product, the electronics unit is between the first adjacent electronics unit and the second adjacent electronics unit. This is a simple way to retrofit existing embodiment to facilitate a Marquee type display. However, there are also applications where this variation is preferable for reasons of cost or reliability.

Figure 3:
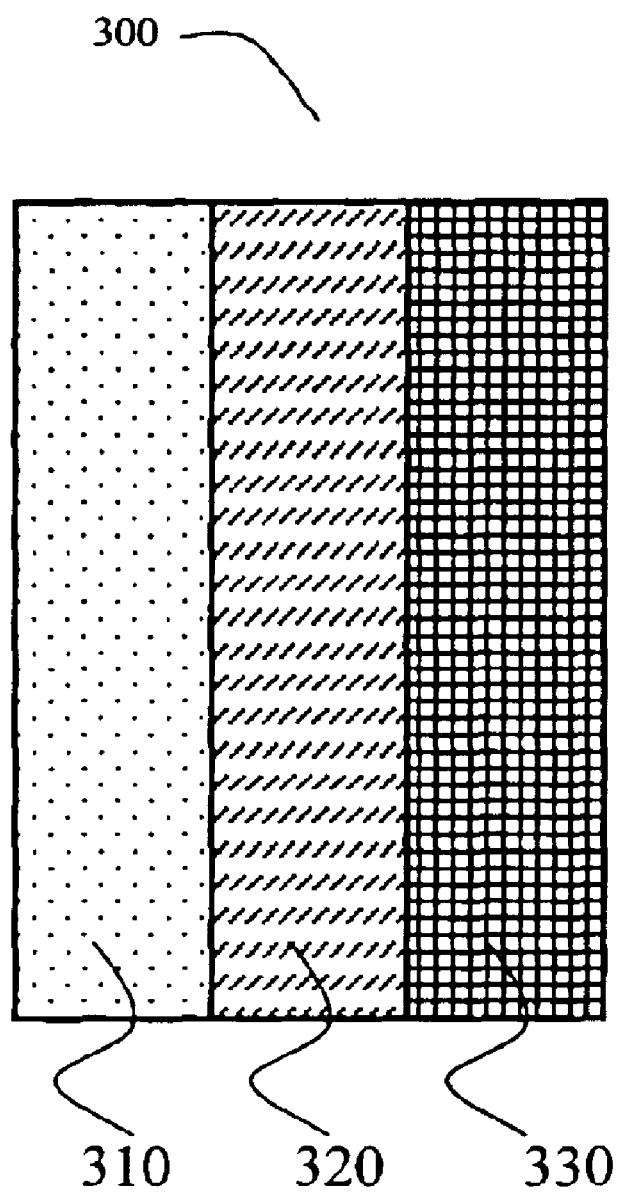
FIG. 3 illustrates a schematic view of a pixel unit.

As mentioned above, the present invention (turning to FIG. 3) furthermore relates to embodiments of a front-lit color display panel comprising at least one pixel unit 300, each pixel unit having a layered structure including a sequence of: a transparent conductor 310, an active layer containing stabilized chiral nematic liquid crystal 320, and a rear conductive layer 330, and wherein the at least one pixel unit includes a pixel element in which the stabilized chiral nematic liquid crystal assumes a reflective state in which a predetermined color is reflected. It should be noted that the layer structure need to have some rigidity in order for the LC to perform predetermined transitions between optical states. However, the structural stability may be achieved either using contributions from each of the layers, or using contributions from as few as even a front-most and a rear most layer in the sequence.

According to one embodiment of the display panel, the rear conductive layer is transparent, and wherein the rear portion of the pixel unit includes a material selected from the list: a black backing, an opaque backing, a partially reflective backing, a fluorescent backing, a dichroic backing, a reflective backing, an active optically illuminating backing, and an active ultraviolet illuminating backing.

According to another embodiment of the display panel, one of the transparent conductor and the rear conductive layer is subdivided into a plurality of discontinuous regions, each of the regions being provided with a separate electrical connector in electrical contact with the region and extending to the rear portion of the pixel unit.

According to a useful variation embodiment of the display panel, the pixel units are arranged such that each of the regions of a pixel unit of the first group is adjacent to one of the regions of a pixel unit from each of the second and third groups.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A front-lit display panel comprising:
   (a) a plurality of pixels units, each pixel unit having:
      (i) a layered structure including a sequence of a transparent conductor, an active layer containing liquid-crystal-type molecules, and a rear conductive layer, parts of said pixel unit which lie on a side of said rear conductive layer remote from said active layer being designated as the "rear portion" of said pixel unit,
      (ii) a first electrical connector in electrical contact with said rear conductive layer and extending to the rear portion of said pixel unit, and
      (iii) a second electrical connector in electrical contact with said transparent conductor and extending to the rear portion of said pixel unit; and
   (b) a plurality of electronics module for respectively receiving each pixels units, each said module having
      (i) a first conformal interconnection facility with the at least two contacts adapted for making electrical contact with said first and second electrical connectors of one of said pixel unit, and
      (ii) a second conformal interconnection facility for interfacing with at least one data communications line and at least one electric power line; and
   (c) an assembly board for receiving said plurality of second conformal interconnection facilities, each receiving position having at least two contacts respectively adapted for making electrical contact with said data communications line and with electric power line of one of said electronics modules.

2. The display panel of claim 1, wherein said active layer contains a material selected from the list: a colored dye and a colored pigment.

3. The display panel of claim 1, further comprising a colored filter positioned in front of said transparent conductor.

4. The display panel of claim 1, wherein said active layer includes PDLC material.

5. The display panel of claim 1, wherein said active layer includes chiral nematic liquid crystal material.

6. The display panel of claim 1, wherein said assembly board has a plurality of sockets, one of said sockets being located at each of said module receiving positions, and wherein the rear portion of each module includes a conformal interface shaped for engaging one of said sockets.

7. The display panel of claim 1, wherein said first and second connectors include connecting strips associated with a conformal interface port of the respective module.

8. The display panel of claim 1, wherein said rear conductive layer is transparent, and wherein the rear portion of said pixel unit includes a material selected from the list: a black backing, an opaque backing, a partially reflective backing, a fluorescent backing, a dichroic backing, a reflective backing, an active optically illuminating backing, and an active ultraviolet illuminating backing.

9. The display panel of claim 1, wherein said plurality of pixel units, includes a first group of pixel units in which said active layer assumes a relatively high reflectivity state in which a first color is reflected, a second group of pixel units in which said active layer assumes a relatively high reflectivity state in which second color is reflected, and a third group of pixel units in which said active layer assumes a relatively high reflectivity state in which a third color is reflected.

10. The display panel of claim 1, wherein one of said transparent conductor and said rear conductive layer is subdivided into a plurality of discontinuous regions, each of said regions being provided with a separate electrical connector in electrical contact with said region and extending to the rear portion of said pixel unit.

11. The display panel of claim 10, wherein said regions are arranged in a two dimensional array, one of said dimensions corresponding to two of said regions.

12. The display panel of claim 1, wherein said layered structure of each of said pixels further includes:
   (a) an intermediate transparent conductor and a second active layer containing liquid-crystal-type molecules, said intermediate transparent conductor and said second active layer being located between said first-mentioned active layer and said rear conductive layer, and (b) a third electrical connector in electrical contact with said intermediate transparent conductor and extending to the rear portion of said pixel unit.

13. The display panel of claim 1 wherein the pixel unit is detachable from the electronics module and the electronics unit is substantially integral to the assembly board.

14. The display panel of claim 1 wherein the pixel unit is substantially integral to the electronics module and the electronics unit is detachable from the assembly board.

15. The display panel of claim 1 wherein the pixel unit is detachable from the electronics module and the electronics unit is detachable from the assembly board.

16. The display panel of claim 1 wherein the pixel unit of a single multilayered pixel having predetermined dynamic optical properties in each layer.

17. The display module of claim 16 wherein the electronics module receives a plurality of pixel units.

18. The display module according to claim 1 wherein the pixel unit is connected to the electronics module using a flexible cable.

19. The display module according to claim 1 wherein the electronics unit is connected to the assembly board using a flexible cable.

20. The display module according to claim 1 wherein the electronics module includes at least one data communications interface to at least one neighboring electronics module on the assembly board.

21. The display module according to claim 1 wherein the electronics module includes at least one electrical interface to at least one neighboring electronics module on the assembly board.

22. The display module according to claim 1 wherein the electronics module includes a programmable microprocessor.

23. A display module computer program, comprising:
  a) a computer usable medium having computer readable program code embodied therein for transferring data communications related to a current display state from an electronics module of a front lit display panel according to claim 1 to an adjacent electronics module on the front lit display panel,
  b) the computer readable program code in said computer usable medium including:
    i) first computer readable program code for causing a computer to schedule transfer of a current state of pixel unit associated with an electronic unit;
    ii) tied to the first computer readable program code, second computer readable program code for causing the computer to transfer the current state of pixel unit from the respective associated electronic unit to a first adjacent electronics unit; and
    iii) tied to the second computer readable program code, third computer readable program code for causing the computer to accept a current state of a pixel unit from a second respective associated adjacent electronic unit.

24. The display module computer program according to claim 23 wherein the electronics unit is between the first adjacent electronics unit and the second adjacent electronic unit.

25. A front-lit color display panel comprising at least one pixel unit, each pixel unit having a layered structure including a sequence of: a transparent conductor, an active layer containing stabilized chiral nematic liquid crystal, and a rear conductive layer, and wherein said at least one pixel unit includes a pixel element in which said stabilized chiral nematic liquid crystal assumes a reflective state in which a predetermined color is reflected.

26. The display panel of claim 25, wherein said rear conductive layer is transparent, and wherein the rear portion of said pixel unit includes a material selected from the list: a black backing, an opaque backing, a partially reflective backing, a fluorescent backing, a dichroic backing, a reflective backing, an active optically illuminating backing, and an active ultraviolet illuminating backing.

27. The display panel of claim 25, wherein one of said transparent conductor and said rear conductive layer is subdivided into a plurality of discontinuous regions, each of said regions being provided with a separate electrical connector in electrical contact with said region and extending to the rear portion of said pixel unit.

28. The display panel of claim 27, wherein said pixel units are arranged such that each of said regions of a pixel unit of said first group is adjacent to one of said regions of a pixel unit from each of said second and third groups.

29. The display panel of claim 25 wherein the liquid crystal includes a material selected from the group: a dye and a pigment.

* * * * *